United States Patent
Ghazali

(10) Patent No.: US 7,150,306 B2
(45) Date of Patent: Dec. 19, 2006

(54) COLLAPSIBLE CAR SUN SHADE

(75) Inventor: Ashraf Ghazali, Houston, TX (US)

(73) Assignee: Shieldzup Holdings, Inc., Tomball, TX (US)

( * ) Notice: Subject to any disclaimer, the term of this patent is extended or adjusted under 35 U.S.C. 154(b) by 49 days.

(21) Appl. No.: 10/973,490

(22) Filed: Oct. 26, 2004

(65) Prior Publication Data

US 2006/0086470 A1    Apr. 27, 2006

(51) Int. Cl.
*B60J 11/04*    (2006.01)
(52) U.S. Cl. ............... 160/370.21; 160/80; 135/88.07
(58) Field of Classification Search ........... 160/370.21, 160/62, 63, 71, 80, 44, DIG. 4; 296/97.7, 296/97.9; 135/88.01, 88.05, 88.07
See application file for complete search history.

(56) References Cited

U.S. PATENT DOCUMENTS

| | | | | |
|---|---|---|---|---|
| 2,608,942 A | * | 9/1952 | Smith | 52/3 |
| 3,870,061 A | * | 3/1975 | Lowery | 135/88.07 |
| 3,952,758 A | * | 4/1976 | Addison et al. | 135/88.07 |
| 4,805,654 A | * | 2/1989 | Wang | 135/88.07 |
| 5,197,503 A | * | 3/1993 | Chen | 135/88.07 |
| 5,700,048 A | * | 12/1997 | Wade et al. | 296/163 |

* cited by examiner

*Primary Examiner*—David Purol
(74) *Attorney, Agent, or Firm*—Akin Gump Strauss Hauer & Feld LLP

(57) ABSTRACT

A collapsible car sun shade assembly consists of a fabric having eyelets on each corner for covering at least the roof of the vehicle. The fabric has outlets covered with lids that can move upward as air pressure builds under the fabric. The fabric is deployed on telescopic pipes. The top of each telescopic pipe has an eyelet lock. The telescopic pipes are attached to dials that can be locked at any angle. The dials are fixed on a plate that is secured to the vehicle.

10 Claims, 4 Drawing Sheets

COLLAPSIBLE CAR SUN SHADE

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention of a collapsible car sun shade can be categorized in the field of consumer products.

2. Description of the Related Art

In summer everyone wants to park their vehicle under the shade, either a tree or building, in order to protect him or herself from damaging sunlight exposure. Parking lots of almost all the department stores, malls, shopping plazas, roadside businesses, schools, hospitals, clinics, apartment complexes, office buildings, parks, theme parks, cinemas, and other public and private places of business do not have any facility for parking cars under the shade.

BRIEF SUMMARY OF THE INVENTION

This invention provides handy sun shade anywhere at any time for any vehicle. This invention not only protects the consumer from the chances of probable heat stroke due to high temperature inside the vehicle, but also increases the fuel efficiency of the vehicle and the life of the vehicle's air conditioner. The only way to reduce the inside temperature of the vehicle is to have a sufficient gap for flowing air between the top of the surface of the vehicle and the shade. This was achieved in the past by assembling bulky structures requiring an excess of physical effort or by time consuming and confusing procedures. This invention overcomes all these difficulties. This invention of a car sun shade provides totally effortless operation and easy deployment of sunshade in a very little time. Since all of the assembly except the fabric sheet, are mounted on a vehicle without effecting the vehicle beautification and cosmetics and without tampering with the vehicle body, the consumer does not need to waste time in arranging parts before the deployment of the sun shade. There is no need to place suction or weighted objects, or tighten loops or screws after the deployment of the sun shade. The consumer is also free from the fear of theft of the assembly mounted on a vehicle as it cannot be removed until the car is unlocked. The consumer also has the peace of mind that the assembly and the sun shade have all possible protective measures to avoid damage of any kind to the vehicle due to air turbulence. The consumer also saves time when removing the sun shade without any physical effort.

DETAILED DESCRIPTION OF THE PREFERRED EMBODIMENTS

Figure 1:
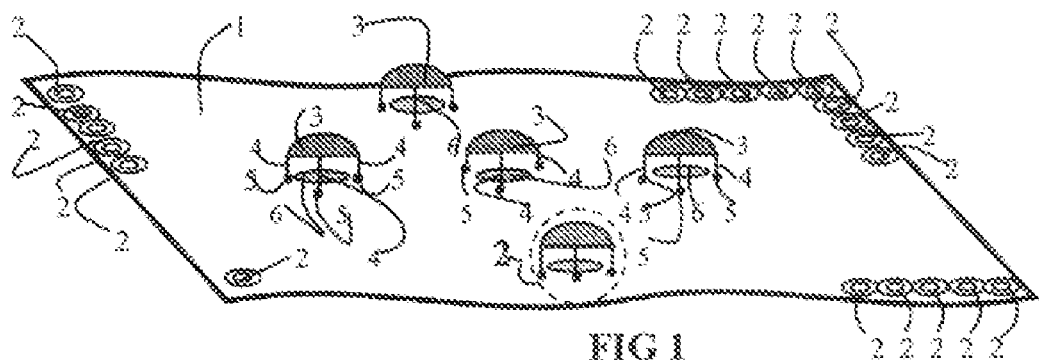
FIG. 1 is a view of a fabric sheet for covering the vehicle's surface and illustrating a car shade system with emphasis on the release of air pressure under the fabric sheet by means of air outlets covered with foam lids which are attached by means of shoe string-like string inserted into small eyelets around the air outlet.

FIG. 1 is a view of a fabric sheet 1 for covering a vehicle's surface, illustrating a car shade system with emphasis on the release of air pressure under the fabric sheet by means of air outlets 6 covered with foam lids 3. The fabric sheet 1 includes a substantially rectangular fabric having multiple eyelets 2 on all four corners. To cover the surface of a smaller vehicle, the eyelet(s) 2 on the fabric are in such a pattern that one of the corners of the fabric has a single eyelet 2, and each of the two other opposite corners have five eyelets 2 in a row and necessarily in line with that of the single eyelet 2, and the remaining last corner of the fabric 1 which is diagonally across from the single eyelet 2 have nine eyelets 2 in an L-shaped pattern with five in a row at the width and five in a row at the length of the fabric 1. The fabric sheet 1 has five air outlets 6, each of six inches in diameter, and in such a pattern that three air outlets 6 are parallel to length of the fabric 1 and the three air outlets 6 are parallel to the width of the fabric 1 and each fully covered with the lids 3.

Figure 2:
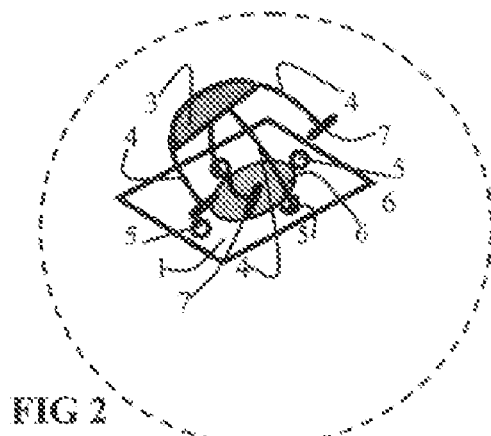
FIG. 2 is a close up view of a foam lid to be attached with strings over the air outlets.

FIG. 2 is a close up view of a lid 3 made of foam or other ultra-light material that are slightly bigger than the size of the air outlets 6 and each lid 3 is equipped with four two-inch long strings 4 and each string 4 is equipped with a hard tip 7 which can be passed through the small or shoe eyelet-size eyelets 5 around the air outlet 6. Each hard tip 7 is nearly a half of an inch, and one half of the length of that hard tip is coupled to the string 4 in order to keep itself in a perpendicular position to the string 4, and each lid 3 is then attached with the fabric 1 by the four strings 4, such that the hard tips 7 of the strings 4 are passed through the small or shoe eyelet-size eyelets 5 around the air outlet 6.

Figure 3:
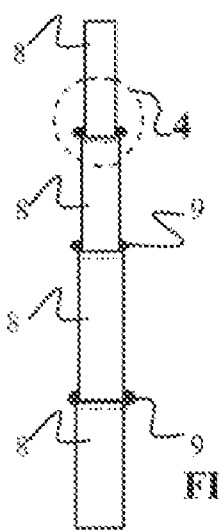
FIG. 3 is a view of telescopic pipes illustrating their full extension with all four levels secured by hollow spring pin locks having a spring inside.

FIG. 3. is a view of a telescopic pipe 8 illustrating its full extension with all of its four levels. The telescopic pipe 8 are tubular structures similar to radio antenna and made of lightweight metal such as aluminum, which can be extended up to four levels 8 and each level 8 has nearly a one foot extension, and is collapsible to the minimum length of one level. The telescopic pipes 8 are weather proof and lockable at the full height by hollow cylindrical spring pin locks 9 placed wholly inside at the bottom of each extension of telescopic pipes 8 except the first extension, and in such a way that both the ends of the spring pin lock 9 are coming out from holes located on opposite sides of the telescopic pipes 8.

Figure 4:
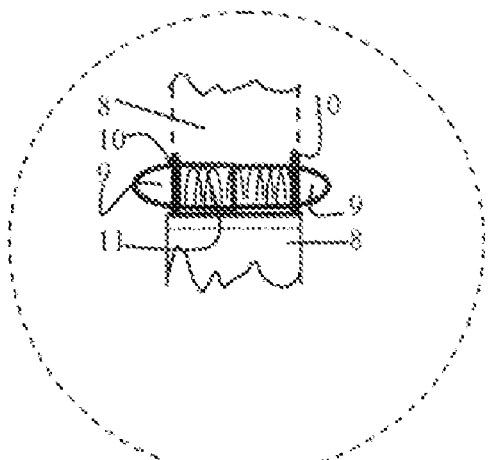
FIG. 4 is a close up view of a spring pin lock.

FIG. 4. is a close up view of spring pin lock 9. Each end of the spring pin lock 9 has a small ring 10 over its cylindrical shape to keep the spring pin lock 9 inside the telescopic pipes 8. The spring pin lock 9 has a spring 11 inside and when the telescopic pipes 8 are extended, the spring 11 pushes out the spring pin lock 9 from the side holes of telescopic pipes 8 and prevents its extended levels from an undesired collapse. The spring pin locks 9 can be of different widths depending upon the width of the telescopic pipes 8 but with the same thickness.

Figure 5:
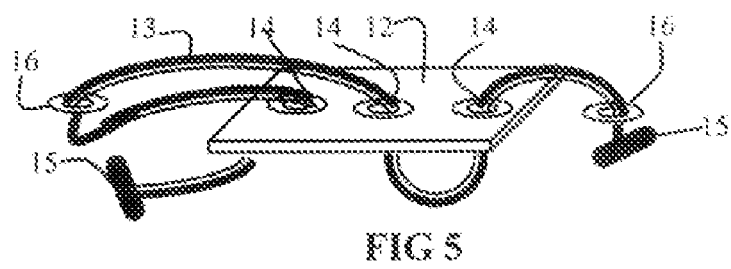
FIG. 5 is a view of a slidable tension adjuster having vinyl coated metallic wire.

FIG. 5 is a view of a slidable tension adjuster 12 having three outlets 14 from which vinyl-coated metallic wire 13 passes through it and attached with eyelets 16 on metallic plates 38. The vinyl-coated wire 13 has tips 15 at both of its ends of nearly a half of an inch in length, and only one half of the length of that tip is coupled to the vinyl-coated metallic wire 13 in order to keep itself in a perpendicular position with the vinyl-coated metallic wire 13. The tip 15 of vinyl-coated metallic wire 13 is thick enough to pass through the eyelets 16 on metallic plates 38. The slidable tension adjuster 12 works one way and can be pulled only, to raise the tension in vinyl-coated metallic wire 13 in order to keep the metallic plates 38 secure over the surface of the vehicle.

Figure 6:
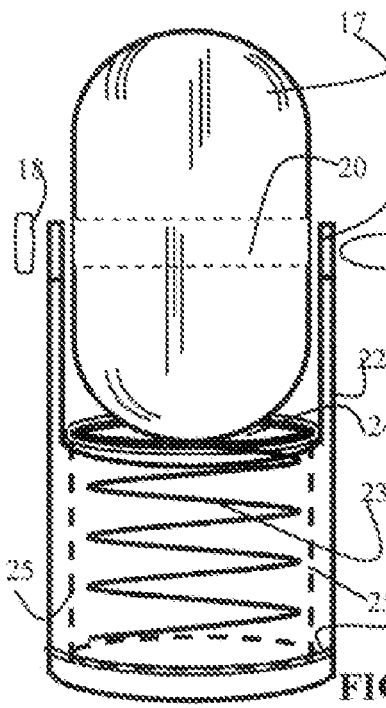
FIG. 6 is an assembly front view of an eyelet lock in an unlocked position.

FIG. 6 is an assembly front view of an eyelet lock in a unlocked position. The upper end of the last level of each telescopic pipe 8 is equipped with the eyelet locks, which hold the fabric 1 over the telescopic pipe 8. The eyelet lock is made of lightweight metal such as aluminum, is of a tubular shape and is independently tightened at the top end of the upper level of each telescopic pipe 8. The eyelet lock comprises a metallic capsule 17, which is mounted on top of the metallic tube 22. The metallic capsule 17 is fixed by a small shaft 19 passing from one side of the pivot hole 21 located at the upper portion of the outer metallic tube through the middle of the metallic capsule 20 toward the other side of the pivot hole 21 of outer metallic tube 22. The small shaft is secured by element 18. The metallic capsule 17 is freely rotated at a fixed place and over a flat oval surface 24. The flat oval surface 24 is a welded metallic lid over the tubular base 25, which has spring 23 inside that is longer in length than the tubular base 25 of the flat oval surface 24. Both the spring 23 and the tubular base 25 are placed inside the outer metallic tube 22. The ring 26A located inside and at the bottom of the outer metallic tube 22, which is smaller than the diameter of the spring 23, does not allow the spring 23 to go down further inside the telescopic pipes 8.

Figure 7:
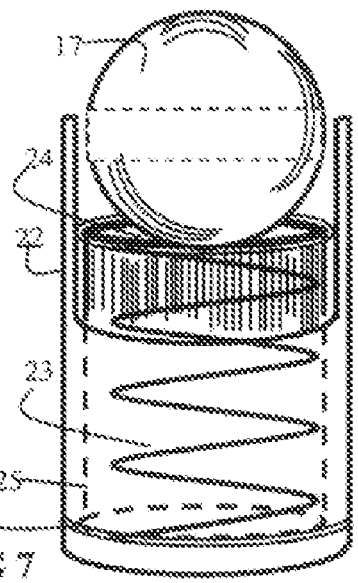
FIG. 7 is an assembly front view of the eyelet lock in a locked position

FIG. 7 is an assembly front view of the eyelet lock in a locked position. The flat oval surface 24 moves up by the spring 23 pushing it from the inside of the tubular base 25 but the flat oval surface 24 is impeded by the metallic capsule 17 attached over the outer metallic tube 22.

Figure 8:
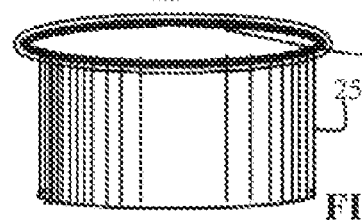
FIG. 8 is a side view of a round tubular shaped piece having oval top lid, which is to slide into the outer walls of the eyelet lock and on which a metallic capsule of the eyelet lock can be rested.

FIG. 8 is a side view of the round tubular base 25 and flat oval surface 24, which is to be slid into the outer metallic tube 22 of the eyelet lock and on which the metallic capsule 17 of the eyelet lock can rest.

Figure 9:
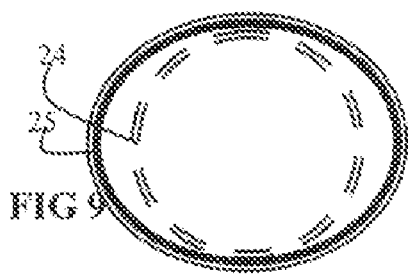
FIG. 9 is a top view of the round tubular shaped piece having oval top lid, which is to be slid into the outer walls of the eyelet lock and on which a metallic capsule of the eyelet lock can be rested.

FIG. 9 is a top view of the round tubular base 25 having oval top lid 24, which is to be slid into the outer metallic tube 22 of the eyelet lock and on which metallic capsule 17 of the eyelet lock can rest.

Figure 10:
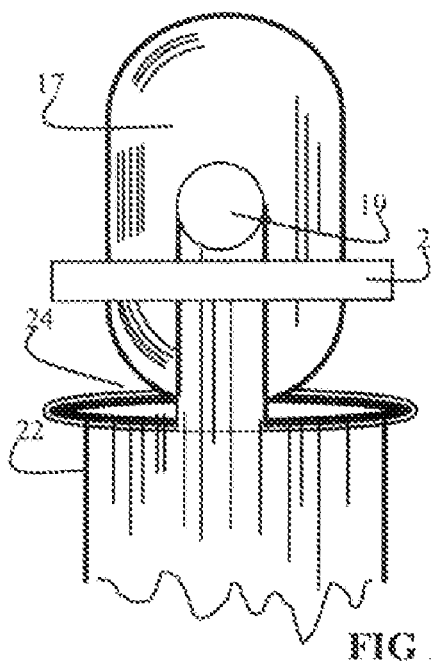
FIG. 10 is a side view of the eyelet lock in an unlocked position with a fabric eyelet.

FIG. 10 is a side view of the eyelet lock in an unlocked position. The flat oval surface 24 moves up by the spring pushing it from the inside of the tubular base 25 but the flat oval surface 24 is impeded by the metallic capsule 17 attached over the outer metallic tube 22. The diameter of the outer metallic tube 22 is a little smaller than the diameter of eyelets 2 in the corners of the fabric sheet 1 to allow the eyelets 2 on the fabric to pass over the outer metallic tube 22. The flat oval surface 24 inside the outer metallic tube 22 does not allow the eyelets 2 to go down further over outer walls of the telescopic pipes 8.

Figure 11:
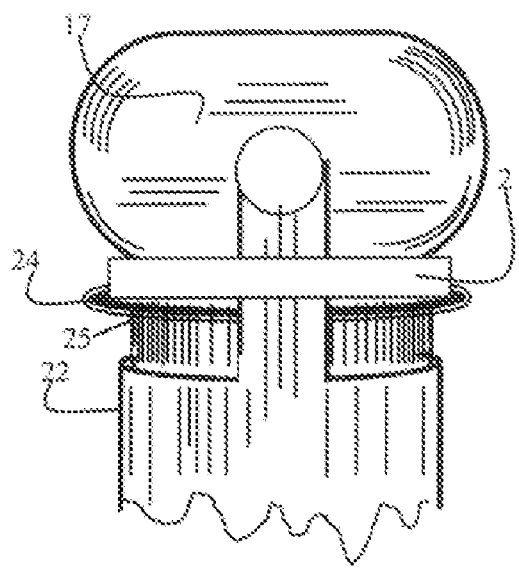
FIG. 11 is a side view of the eyelet lock in a locked position with the fabric eyelet.

FIG. 11 is a side view of the eyelet lock in a locked position, if metallic capsule 17 is lying horizontally prevents the eyelet 2 from moving above the metallic capsule 17 which is at the top of the telescopic pipes 8.

Figure 12:
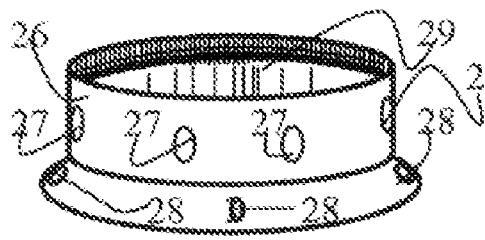
FIG. 12 is a side view of a cylindrical outer dial having perforations for a lock pin on its wall and holes at bottom edges to be fixed on a metallic plate.

FIG. 12 is a side view of a cylindrical outer dial 26 having holes 28 at its bottom edges to be fixed on metallic plate 38. The diameter of the outer dial 26 is slightly bigger than the diameter of inner dial 30 in order to slide the inner dial 30 into the outer dial 26 for free circular rotation inside the outer dial 26 and over a flat surface of metallic plate 38. The wall of the outer dial 26 has perforations 27 in the middle of its height for passing lock pin 33 of inner dial 30 through it. The top edge of the outer dial 26 has a ring 29 inside its wall to keep the inner dial 30 inside the outer dial 26.

Figure 13:
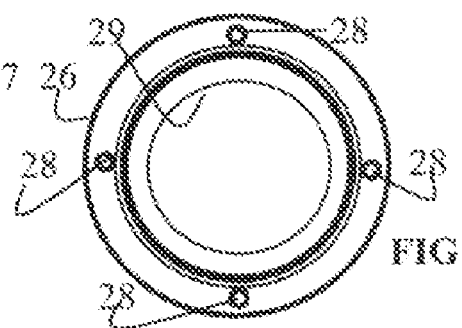
FIG. 13 is a top view of the cylindrical outer dial having holes at its bottom edges to be fixed on the metallic plate.

FIG. 13 is a top view of the cylindrical outer dial 26. The outer dial 26 is a one-inch high tubular thick pipe, which has a slightly wider flat base at the lower edge of its outer walls with perforations 28 for screwing it on a flat surface of metallic plate 38.

Figure 14:
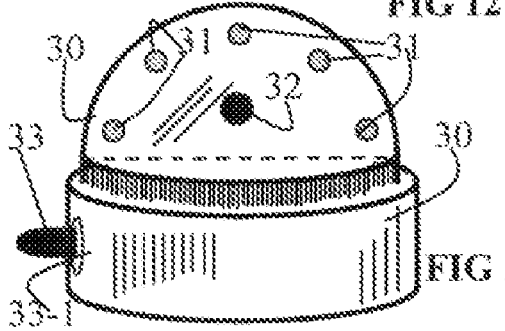
FIG. 14 is the side view of an inner dial.

FIG. 14 is the side view of inner dial 30. The inner dial 30 is hollow from inside and approximately 25% higher than the outer dial 26. The inner dial 30 is fully capped at its top and has two height levels that differ in diameters. The first level of height of inner dial 26 reaches that level of height at which the top ring of the outer dial 26 is located, and that first level of inner dial 30 is lesser enough in diameter to be slid into the outer dial 26 from the bottom of the outer dial 26 and big enough in diameter to remain inside the ring 29 located at the top edge of the outer dial 26. A single hole 33-1 is given for passing a pin lock 33 in the middle wall of the first level of height of inner dial 30, which is precisely in line with the outer dial 26 wall's perforations 27. The second level of height of the inner dial 30 begins at the height of the inner dial 30, and the size of the this second level is small enough in diameter to come out from the ring 29 located at the top edge of the outer dial 26. The top surface of the inner dial 30 has two half-circle D-shaped pieces and has the same diameter or length as of the diameter or width of the top surface which is the second level of inner dial 30. Both the D-shaped pieces are an integral part of the top surface of the second level of the inner dial 30 and are apart enough from each other to precisely place between them, the metallic piece 35-1 on which a socket 35 for the telescopic pipes 8 is mounted. Both the D-shaped pieces have pivot hole 32 in the middle so the metallic piece 35-1 can be fixed for its movement from 0 to 180 degree in the air. The metallic piece 35-1 is wide enough to have a pin lock 9A inside. Both the D-shaped pieces have half-centimeter perforations 31 along their circular edge for pin lock 9A to lock the metallic piece at any angle from 0 to 180 degree aligned to the perforation.

Figure 15:
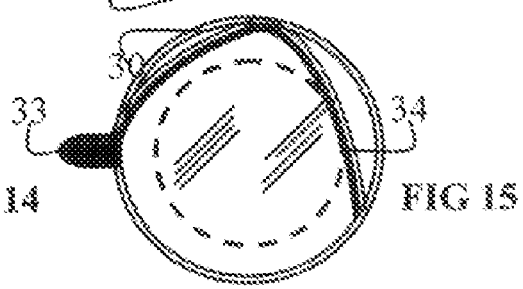
FIG. 15 is the bottom view of a hollow inner dial having a metallic strip inside attached with a metallic capsule serving as a pin.

FIG. 15 is a bottom view of the hollow inner dial 30 having a metallic strip 34 inside and attached with a leaf spring pin lock that is made of a metallic capsule. The metallic strip 34 is bent in two folds for providing enough force to the pin lock 33 to keep itself always out from the single hole 33-1 of inner dial 30 and holes 27 of outer dial 26.

Figure 16:
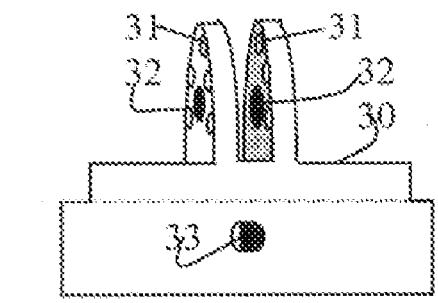
FIG. 16 is an angular view of the inner dial.

FIG. 16 is an angular view of inner dial 30 showing the top surface of the inner dial 30, which has two half-circle shape D-shaped pieces and has same diameter or length as of the diameter or width of the top surface, which is the second level of inner dial 30. Both the D-shaped pieces are an integral part of the top surface of the second level of inner dial 30 and are apart enough from each other to precisely place between them, the metallic piece 35-1 on which the socket 35 for telescopic pipes 8 is mounted. Both the D-shaped pieces have pivot hole 32 in the middle so the metallic piece 35-1 can be fixed for its movement from 0 to 180 degrees in the air. Both the D-shaped pieces have half-centimeter perforations 31 along their circular edges for pin lock 9A to lock the metallic piece at any angle from 0 to 180 degrees aligned to the perforations.

Figure 17:
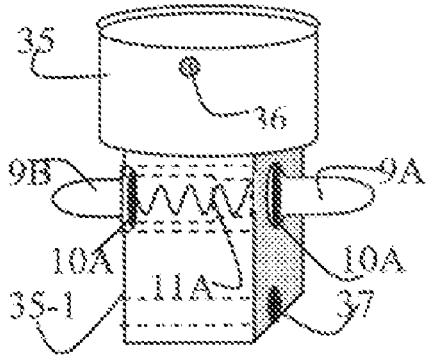
FIG. 17 is a view of a socket and pin lock assembly on which the telescopic pipes are fixed and placed on the inner dial for setting an angular position of the telescopic pipes in the air.

FIG. 17 is a view of the socket 35 and pin lock assembly 35-1 on which telescopic pipes 8 are fixed for setting an angular position of the telescopic pipes 8 over the inner dial 30. The first or base level of the telescopic pipes 8 is fixed in socket 5 by the tightening of the screw 36. The socket 35 is high enough to hold the first or base level of the telescopic pipe 8 strongly. The pin lock assembly 35-1 on which the socket 35 is mounted has a pin lock having rings 10A over its cylindrical shape surface 9A for locking the articulation of telescopic pipe 8 and the pin lock 9A has a spring inside 11A between the two hollow cylindrical shape pieces 9B, which can be slid into each other. The rings 10A over the cylindrical shape at each end of the pin lock 9A are bigger in diameter than the perforation 31 of D-shaped pieces of inner dial 30 in order to keep the spring pin lock 9A inside the walls of D-shaped pieces of inner dial 30, but the tips of the pin lock are long enough to come out from the D-shaped pieces of inner dial 30.

Figure 18:
FIG. 18 is a view of a metallic plate to be placed and fixed by means of internal screws on vehicle body.

FIG. 18 is a view of metallic plate 38 to be placed and fixed by means of internal screws 44 in holes 39 of metallic plate 38, on vehicle body. The metallic plate 38 allows the fundamental structure of the car sun shade to be mounted on the vehicle all the time without tampering with the vehicle body. The metallic plate 38 has a 90-degree bend at one of its sides and bends inside again for 90-degrees on the side of first bend, and at the point where the thickness of the vehicle hood and trunk is achieved. The second bend allows the metallic plate 38 to be secured from inside the hood and trunk, and leaves the surface of the metallic plate 38 only for one-centimeter from inside. The metallic plate 38 is secured over the surface of the vehicle by tightening the screws 44 inside the hood or trunk, which pass through holes 39 of the metallic plate 38 to the vehicle body. The metallic plate 38 has a small hole 41 at its edge for vinyl-coated wire 13 connected to the slidable tension adjuster 12 made of vinyl-coated metal.

Figure 19:
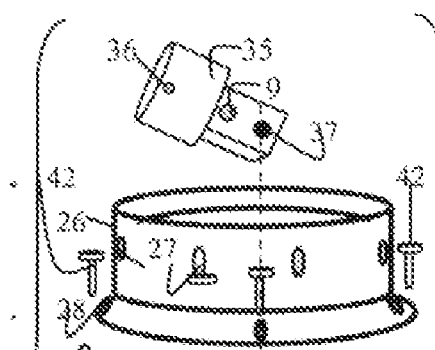
FIG. 19 is a complete assembly view of an auto-lock dial.

FIG. 19 is an exploded view of the auto lock dial assembly. The inner dial 30, along with leaf spring pin lock 33 is placed into outer dial 26. The socket and pin lock assembly 35-1 is fixed over the inner dial 30 between its two D-shaped pieces having the pin lock 9A inside. A shaft 43 is crossed through pivot hole 32 of the inner dial 30 and through the socket assembly 35-1 using holes 37 and lock with shaft 43. The outer dial 26 is then fixed over the metallic plate 38 by passing screws 42 through holes 28 on the outer dial 26 and holes 40 on the metallic plate 38.

Figure 20:
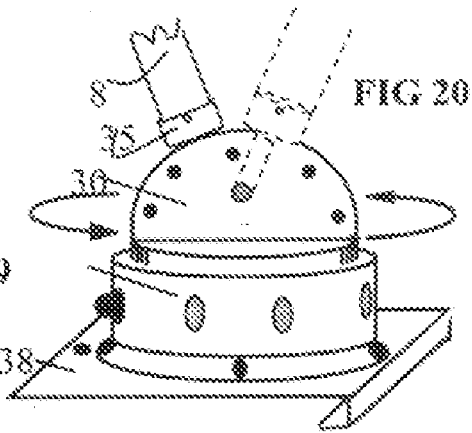
FIG. 20 is a view of the auto-lock dial in assembled form.

FIG. 20 is a view of the auto lock dial in assembled form. The outer dial 26 can be rotated 360 degrees over the metallic plate 38 and can be locked at any desired point. The telescopic pipe 8 mounted on socket 35 can be articulated 180 degrees and can be locked at any angle.

Figure 21:
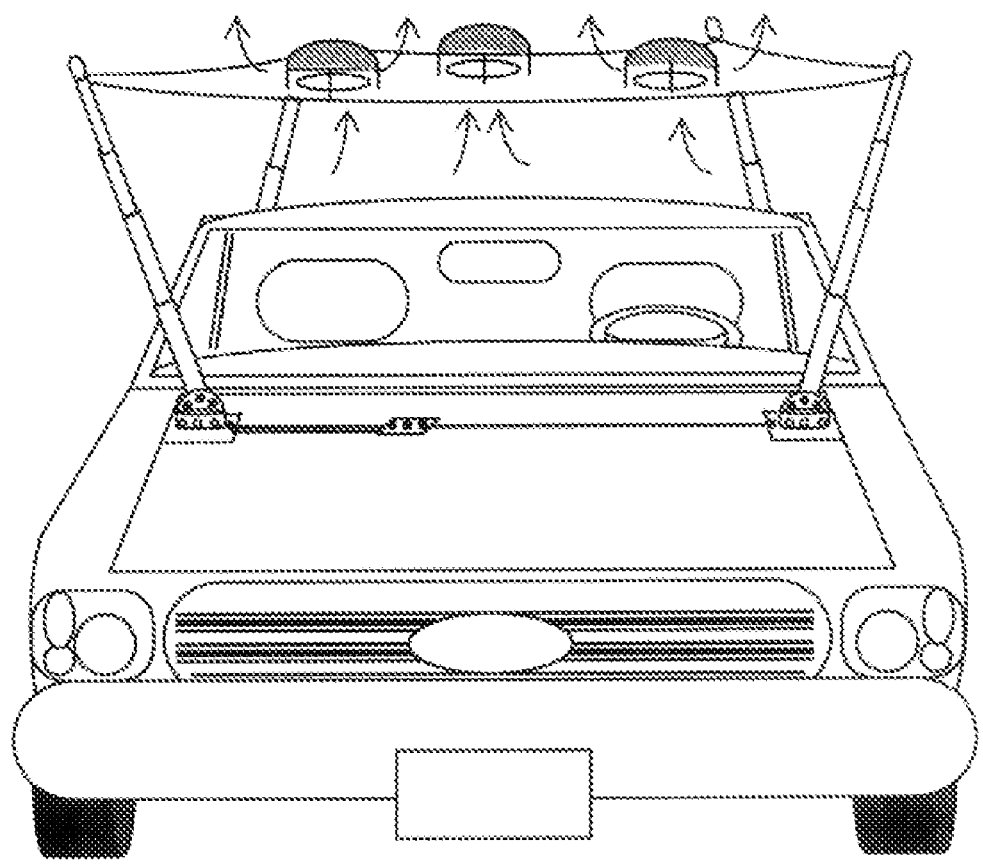
FIG. 21 is a view of the car shade assembly fully deployed on vehicle.

FIG. 21 is a view of the car shade assembly fully deployed on a vehicle.

Figure 22:
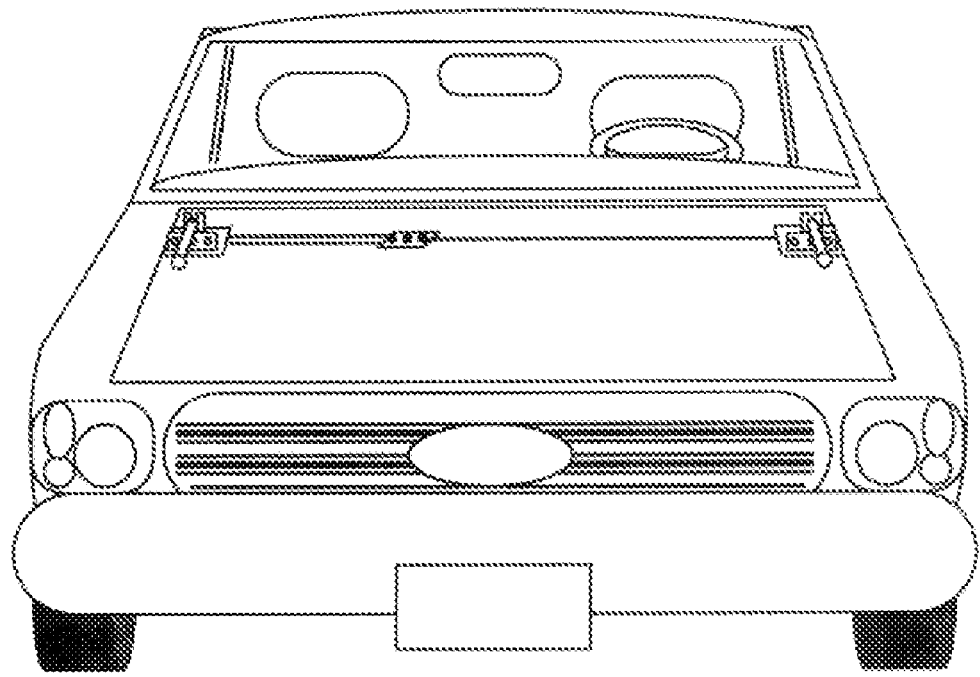
FIG. 22 is a view of a vehicle with the car shade assembly mounted on it, the assembly shown in a retracted position, without shade.

FIG. 22 is view of the vehicle having the mounted car shade assembly in a retracted position without the fabric sheet 1.

The collapsible car sun shade assembly for a vehicle comprises a rectangle ultra light non-perforated fabric sheet that releases the heavy pressure of air turbulence under it by having five air outlets in such a pattern that three air outlets appear parallel to length of the fabric and the three air outlets appear parallel to the width of the fabric and each can be fully covered with the lids. The lids, made of foam, are slightly bigger than the size of the air outlets and each lid is equipped with four two-inch long strings and each string is equipped with a hard tip of nearly half an inch in length, and one half of the length of that hard tip is coupled to the string in order to keep the tip in a perpendicular position to the string, and each lid is then attached to the fabric by means of the four strings, the hard tips of the strings are passed through the small or shoe-eyelet sized eyelet around the air outlet. The fabric is deployed on the four extendible telescopic pipes by inserting eyelets on each of the corners of the fabric, over the telescopic pipes. To cover the surface of a smaller vehicle, the eyelets on the fabric are in such a pattern that one of the corners of the fabric has a single eyelet, and each of the two other opposite corners have five eyelets in a row in line with that of the single eyelet, and the remaining last corner of the fabric which is diagonally across the single eyelet, has nine eyelets in an L-shaped pattern, and appear five in a row at the width and five in a row at the length of the fabric.

The telescopic pipes of the car sun shade assembly are tubular structures similar to radio antenna and made of a lightweight metal such as aluminum, which can be extended up to four levels. Each level has nearly a one foot extension, and is collapsible to the minimum length of one level. The telescopic pipes are weather proof and lockable at the full height by spring pin locks positioned separately at the bottom of each level of the telescopic extension except the first level, so that when the telescopic pipes are extended, the spring pin lock prevents the extended level from undesired collapse towards the lower level. The diameter of the spring pin locks differ depending upon the width of the telescopic pipes in which they are positioned. The telescopic pipes are wide enough in diameter and thick enough in gauge to hold the fabric sheet under heavy air pressure.

The upper end of the last level of each telescopic pipe of the car sun shade assembly is equipped with the eyelet locks, which hold the fabric over the telescopic pipes. The eyelet lock, made of lightweight metal such as aluminum, is tubular in shape and is independently tightened at the top end of the upper level of each telescopic pipe. The eyelet lock comprises a metallic capsule, which is mounted on top of the metallic tube. The metallic capsule is fixed by a small shaft passing from one side of the pivot hole located at the upper portion of the metallic tube and crosses through the middle of the metallic capsule toward the other side of the pivot hole of the metallic tube. The metallic capsule is freely rotated at a fixed place and over a flat oval surface. The flat oval surface is a welded metallic lid over the tubular base, which has spring inside that is longer in length than the tubular base of the flat oval surface. Both the spring and the tubular base are placed inside the metallic tube from the top. The ring located inside and at the bottom of the metallic tube, which is smaller than the diameter of the spring, does not allow the spring to go down further beyond the metallic tube. The flat oval surface moves up by the spring pushing it from the inside of the tubular base, but the flat oval surface is impeded by the metallic capsule attached over the metallic tube. The diameter of the metallic tube is a little smaller than the diameter of fabric eyelets to allow the eyelets on the fabric to pass through the metallic tube. The flat oval surface inside the metallic tube does not allow the eyelets to go down further over outer walls of the telescopic pipes and the metallic capsule does not allow the eyelet to come out from the telescopic pipes if the metallic capsule is lying horizontally.

The telescopic pipes are based on the auto-lock dial, which allows them to rotate from 0 to 360 degrees on the surface and articulate from 0 to 180 degrees in the air and can be locked at any angle associated to surface rotation and articulation. The auto-lock dial is made of lightweight metal such as aluminum and comprises the outer dial and the inner dial. The outer dial is a one-inch high tubular thick pipe, which has a little wider flat base at the lower edge of its outer walls with perforations for screwing it onto a flat surface. The wall of the outer dial is also perforated in the middle of its height for passing a lock pin through it. The top edge of the outer dial has a ring inside its wall to keep the inner dial inside the outer dial for free circular rotation over a flat surface. The inner dial is hollow from inside and approximately 25% higher than the outer dial. The inner dial is fully capped at its top and has two levels of height with different diameters. The first level of height of the inner diameter is started from the surface and goes up to that level of height at which the top ring of the outer dial is located, and the first level of the inner dial is small enough in diameter to be inserted into the outer dial from the bottom of the outer dial and big enough in diameter to remain inside the ring located at the top edge of the outer dial. A hole is given for passing a lock pin in the middle wall of the first level of height of the inner dial, which is precisely in line with the outer dial wall's perforations. The second level of height of the inner dial is started from the end of the first level of height of the inner dial to its end, and the size of the this second level is small enough in diameter to come out from the ring located at the top edge of the outer dial. The inner dial, inside hollow portion, which is the first level of its height, has a steel metallic strip with one of its sides equipped with a metallic capsule that serves as a leaf spring pin lock. The steel strip is bent in two folds for providing enough force to the metallic capsule to keep it out of the holes of the inner dial and the outer dial.

The top surface of the inner dial of the car sun shade has two half-circle D-shaped pieces, and has the same diameter or length as the diameter or width of the top surface of the inner dial, which is the second level of the inner dial. Both the D-shaped pieces are an integral part of the top surface of the second level of the inner dial and are apart enough from each other to precisely place between them, the socket and pin lock assembly on which the telescopic pipes are mounted. Both the D-shaped pieces have a pivot hole in the middle to allow the socket and pin lock assembly to be fixed for from 0 to 180 degrees in the air. The socket and pin lock assembly is wide enough to have the pin lock inside. Each of the D-shaped pieces have half-centimeter perforations along its circular edge for the pin lock to lock the socket at any angle from 0 to 180 degrees aligned to the perforation.

The socket and pin lock assembly has a tubular shaped socket at its top. The first or base level of the telescopic pipes is fixed in the socket by tightening the screws. The socket is high enough to hold the first or base level of the telescopic pipe strongly and the pin lock assembly has a pin-lock completely placed inside along with rings over the cylindrical shape of pins for locking the articulation of the telescopic pipes. The pin lock assembly has a spring inside its two hollow and cylindrical shaped pieces, which can be slid into each other. The rings over the cylindrical shape at each end of the pin lock are bigger in diameter than the perforation of D-shaped pieces of the inner dial in order to keep the spring pin lock inside the walls of the D-shaped pieces of the inner dial once it is fixed but are long enough to come out from the D-shaped pieces of the inner dial.

The car sun shade auto-lock dial is fixed by means of passing screws through the base of the outer dial on the metallic plate with vinyl or rubber coating on the side where it touches the vehicle body to prevent damage to the paint of the vehicle.

The metallic plate allows the fundamental structure of the car sun shade to be mounted on the vehicle all the time without tampering with the vehicle body. The metallic plate has a 90-degree bend at one of its sides and bends 90-degrees inside again on the side of first bend and at the point where the thickness of the vehicle hood and trunk is achieved. The second bend allows the metallic plate to be secured from inside the hood and trunk, and leaves the surface of the metallic plate only for one centimeter from inside. The metallic plate is secured over the surface of the vehicle by tightening the screws inside the hood or trunk, which pass thru the metallic plate to the vehicle body. Each metallic plate has two small holes at their edges for vinyl-coated wire connected to the slidable tension adjuster made of vinyl-coated metal.

The slidable tension adjuster is placed between the two metallic plates and equipped with vinyl-coated wire for pulling the metallic plates to each other. The tension adjuster further secures the metallic plates over the surface of the vehicle which in turns protects the body from damage. The tension adjuster is a flat piece of metal having three outlets to secure the tightness of the vinyl-coated wire between the metallic plates.

The lower level of the telescopic pipes may have some cosmetic covering such that while in the retracted position, that adds to the vehicle's beauty.

The invention claimed is:

1. A collapsible car sun shade comprising:
   a plurality of telescopic pipes;
   a rectangular fabric sheet;
   a plurality of mounting plates, removably mountable on a car;
   a plurality of dials, each of the plurality of telescopic pipes removably attachable to a corresponding one of the plurality of dials, each of the plurality of dials rotatably attachable to a corresponding one of the plurality of mounting plates;
   a plurality of air outlets formed in the sheet;
   a plurality of lids, each lid positioned with one of the plurality of air outlets and attached to the sheet with a string;
   wherein each of the plurality of telescopic pipes is positionable at a plurality of angles relative to the corresponding dial.

2. The sun shade of claim 1 the fabric sheet comprising:
   a plurality of eyelets, at least one of the plurality of eyelets positioned in the fabric sheet at each corner of the fabric sheet.

3. The sun shade of claim 1 each of the mounting plates comprising:
   a slidable tension adjuster.

4. A collapsible car sun shade comprising:
   a rectangular fabric sheet;
   a plurality of eyelets, at least one of the plurality of eyelets positioned in the fabric sheet at each corner of the fabric sheet;
   a plurality of telescopic pipes, a first end of each of the telescopic pipes sized to engage a corresponding one of the plurality of eyelets;
   a plurality of mounting assemblies, each of the plurality of mounting assemblies adjustably connectable with one of the telescopic pipes, the plurality of mounting assemblies configured for removable attachment to a car;
   a plurality of air outlets formed in the sheet;
   a plurality of lids, each lid positioned with one of the plurality of air outlets and attached to the sheet with a string;
   wherein each of the plurality of telescopic pipes is positionable at a plurality of angles relative to the corresponding dial.

5. The sun shade of claim 4 further comprising:
   a plurality of small eyelets positioned in the sheet circumferentially around the air outlets;
   each of the strings are comprising a hardened tip perpendicular to the string, sized to pass through the small eyelets, thereby securing the lid to the sheet.

6. The sun shade of claim 4, each of the plurality of telescopic pipes comprising:
   an eyelet lock, positioned at the first end of the telescopic pipe.

7. The sun shade of claim 4 further comprising:
   a plurality of dials, each of the plurality of dials rotatably attachable to a corresponding one of the plurality of mounting assemblies, wherein each of the plurality of telescopic pipes is removably attachable to one of the plurality of dials.

8. A collapsible car sun shade comprising:
   a rectangular fabric sheet;
   a plurality of eyelets, at least one of the plurality of eyelets positioned in the fabric sheet at each corner of the fabric sheet;
   a plurality of air outlets positioned into the fabric sheet;
   a plurality of lids equivalent in number to the air outlets, each lid being equipped with a plurality of strings thereby securing the lid to the fabric sheet;
   a plurality of telescopic pipes, one end of each of the telescopic pipes sized to engage a corresponding one of the plurality of eyelets;
   a plurality of dials, each of the plurality of telescopic pipes removably attachable to a corresponding one of the plurality of dials, each of the plurality of dials comprising an inner and an outer dial; and
   a plurality of mounting plates, each of the plurality of dials rotatably attachable to a corresponding one of the plurality of mounting plates.

9. The sun shade of claim 8, the outer dials comprising:
   a base, the base comprising a plurality of openings positioned circumferentially at the bottom edge of the outer dial, each of the openings sized to engage a screw, thereby attaching the base of the outer dial to a corresponding one of the plurality of mounting plates.

10. The sun shade of claim 8, the inner dials comprising:
    two half-circle shaped metallic members, positioned side-by-side; and
    a socket assembly positioned between the two half-circle shaped metallic members, the socket assembly sized for mounting the telescopic pipes.

* * * * *